(12) United States Patent
Cheng et al.

(10) Patent No.: US 8,286,307 B2
(45) Date of Patent: *Oct. 16, 2012

(54) MULTI-STAGED HINGE ASSEMBLY AND PORTABLE ELECTRICAL DEVICE COMPRISING THE SAME

(75) Inventors: Ying-Yen Cheng, Taoyuan (JP); Ying-Xing Lee, Taoyuan (JP); I-Cheng Chuang, Taoyuan (JP)

(73) Assignee: HTC Corporation, Taoyuan (TW)

( * ) Notice: Subject to any disclaimer, the term of this patent is extended or adjusted under 35 U.S.C. 154(b) by 522 days.

This patent is subject to a terminal disclaimer.

(21) Appl. No.: 12/493,526

(22) Filed: Jun. 29, 2009

(65) Prior Publication Data
US 2010/0218343 A1 Sep. 2, 2010

(30) Foreign Application Priority Data

Mar. 2, 2009 (TW) ................................ 98106660 A (51) Int. Cl.
*E05D 11/10* (2006.01)
(52) U.S. Cl. .................... 16/330; 16/303; 361/679.27
(58) Field of Classification Search .............. 16/303, 16/330, 297, 337, 334, 319, 386, 307; 379/433.13, 379/433.12; 455/575.4, 575.3; 361/679.27
See application file for complete search history.

(56) References Cited

U.S. PATENT DOCUMENTS

| | | | |
|---|---|---|---|
| 6,115,886 A | 9/2000 | Fujita | |
| 6,175,990 B1 | 1/2001 | Kato et al. | |
| 6,766,180 B2 * | 7/2004 | Doraiswamy et al. | 455/575.1 |
| 7,027,846 B2 * | 4/2006 | Pan | 455/575.3 |
| 7,031,466 B2 * | 4/2006 | Lu et al. | 379/433.13 |
| 7,100,239 B2 * | 9/2006 | Duan et al. | 16/303 |
| 7,337,498 B2 * | 3/2008 | Hsieh | 16/330 |
| 7,401,382 B2 * | 7/2008 | Luo | 16/303 |
| 7,404,235 B2 * | 7/2008 | Duan et al. | 16/330 |
| 7,725,987 B2 * | 6/2010 | Duan et al. | 16/330 |
| 7,952,858 B2 * | 5/2011 | Lee et al. | 361/679.01 |
| 8,018,714 B2 * | 9/2011 | Luke et al. | 361/679.01 |
| 2006/0112517 A1 | 6/2006 | Luo et al. | |
| 2006/0137141 A1 * | 6/2006 | Kuramochi | 16/330 |
| 2007/0186380 A1 | 8/2007 | Kim et al. | |
| 2010/0024165 A1 * | 2/2010 | Kosugi et al. | 16/303 |

FOREIGN PATENT DOCUMENTS

| | | |
|---|---|---|
| CN | 2757503 Y | 2/2006 |
| CN | 2924945 | 7/2007 |
| KR | 2004-0035064 | 4/2004 |
| WO | 01/38679 | 5/2001 |

OTHER PUBLICATIONS

European Search Report from corresponding EPO Application No. 09164044.1 dated Jun. 24, 2010.
Office Action from corresponding Chinese Application No. 200910128129.X dated Oct. 26, 2011.

* cited by examiner

*Primary Examiner* — William L. Miller
(74) *Attorney, Agent, or Firm* — Grossman, Tucker, Perreault & Pfleger, PLLC (57) ABSTRACT

A multi-staged hinge assembly and a portable electrical device comprising the multi-staged hinge assembly are provided. The multi-staged hinge assembly utilizes a spindle with a non-circular cross-section and the relative movement resulting from the movable components disposed on the spindle, such that one of the body portions of the portable electrical device automatically tilts in an angle after the body portions slides with each other. The user could further adjust the angle to meet various use conditions.

24 Claims, 9 Drawing Sheets

MULTI-STAGED HINGE ASSEMBLY AND PORTABLE ELECTRICAL DEVICE COMPRISING THE SAME

This application claims priority to Taiwan Patent Application No. 098106660 filed on Mar. 2, 2009, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a multi-staged hinge assembly for a portable electrical device, In particular, the multi-staged hinge assembly having a simplified structure that allows for the reduction in volume of the portable electrical device.

2. Descriptions of the Related Art

Due to the gradual advancement of industrial technologies and electrical technologies, portable electrical devices are becoming increasingly popular and have also gradually miniaturized in volume for good portability. Meanwhile, to satisfy the various needs of users, portable electrical devices have been designed into different structures to provide users with more diversified operation styles.

For example, to allow users to view information displayed on screens of the portable electrical devices more clearly and also to input relatively complex instructions, portable electrical devices now tend to be designed with both a larger and wider display and a keyboard comprising multiple keys. As these members occupy a large volume, common portable electrical devices currently available are mostly of a clamshell or slide design for convenience in use.

Figure 1:
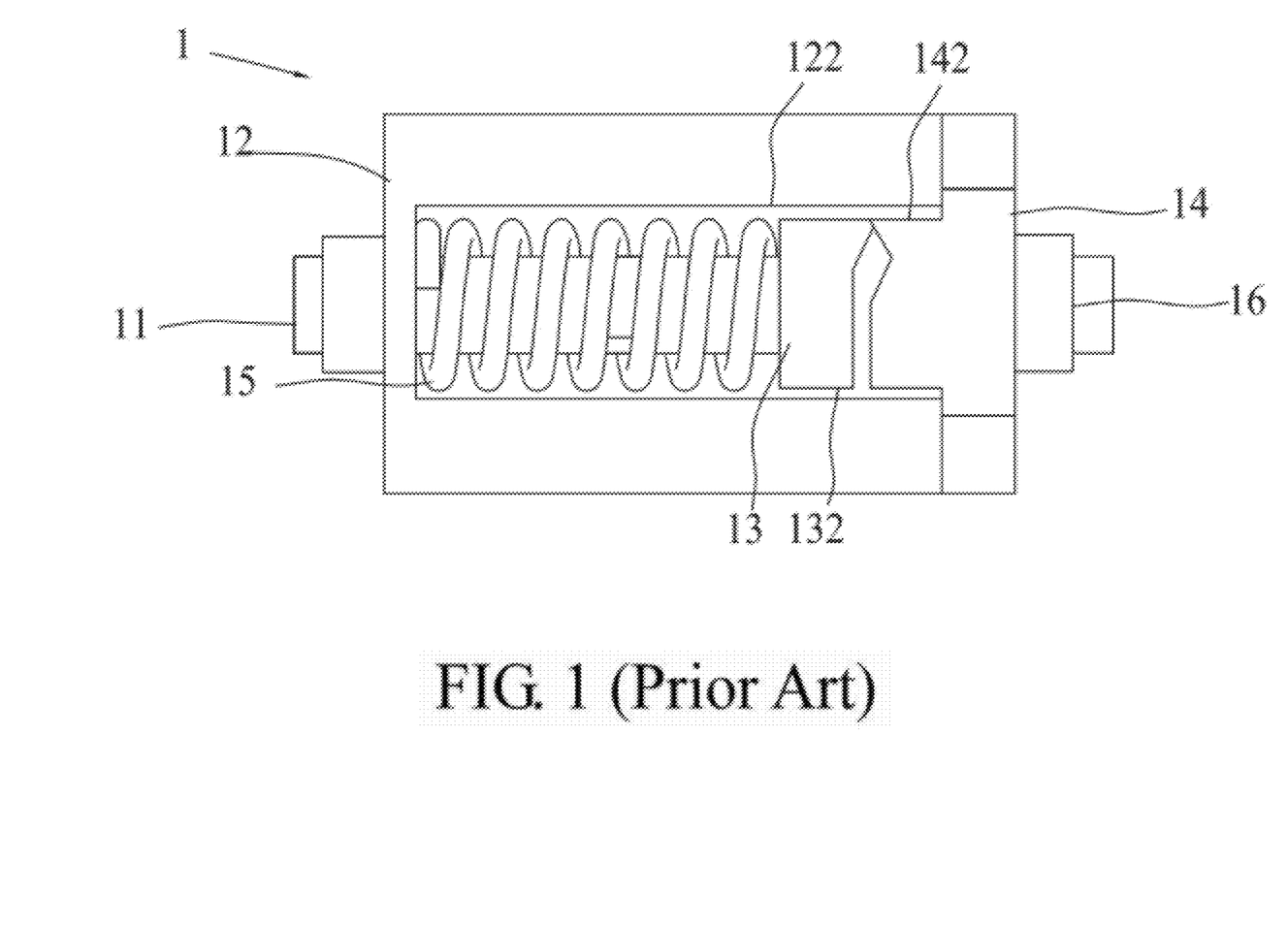
FIG. 1 is a schematic view of a conventional hinge assembly.

A conventional portable electrical device (not shown) made with a slide design comprises a hinge assembly 1 shown in FIG. 1. The hinge assembly 1 is adapted to connect two body portions (now shown) of the portable electrical device together to exhibit a certain angle relative to each other so that users can conveniently view information on the screen and operate the portable electrical device. The hinge assembly 1 comprises a spindle 11 with a circular cross-section, and a spring 15, a first cam 13 and a corresponding second cam 14 inserted sequentially on the spindle 11. The hinge assembly 1 further comprises a stopper 16 fixedly disposed on the spindle 11 and a shell 12 with a non-circular inner periphery 122. Additionally, the first cam 13 also has a non-circular outer periphery 132 corresponding to the inner periphery 122 of the shell 12, while the second cam 14 substantially has a circular outer periphery 142. With this arrangement, the first cam 13 is restricted to move along the spindle 11 within the shell 12 and is prevented from rotating. One of the body portions of the portable electrical device connects with the shell 12, while the other body portion connects with the second cam 14. When the pre-compressed elastic energy of the spring 15 is released to provide a thrust force against the first cam 13, the first cam 13 will be driven to move along the spindle 11 and, accordingly, the second cam 14 will rotate around the spindle 11. Thereby, the body portion connecting with the second cam 14 rotates with respect to the other body portion to form a tilt angle, thus providing a better viewing angle for users. However, the conventional shell 12, which used for restricting the movement of the cam structures, increases the volume of the hinge assembly 1, and thus the volume of the portable electrical device will be increased accordingly.

In view of this, miniaturization of the hinge assembly through, for example, a non-shell hinge design without losing the original functions will help shrink the volume, reduce the weight, lower the cost and improve the market competitiveness of portable electrical devices.

SUMMARY OF THE INVENTION

One objective of the present invention is to provide a multi-staged hinge assembly and a portable electrical device. Because the multi-staged hinge assembly of the present invention uses a spindle having a non-circular cross-section in conjunction with corresponding movable components (e.g., cams) with axial holes of different shapes, the shells that were needed in conventional hinge assemblies can be eliminated straightforwardly while still maintaining relative movement between the movable components. This results in a simpler construction, smaller overall volume, higher assembling efficiency and consequently lower the costs of the multi-staged hinge assembly, making the multi-staged hinge assembly of the present invention especially suitable for a slide type of portable electrical devices.

The present invention provides a multi-staged hinge assembly, comprising a spindle, an elastic device, a first movable component and a second movable component. The elastic device, the first movable component and the second movable component are disposed sequentially on the spindle, while the first movable component and the second movable component each have a cam structure corresponding to each other. The first movable component is adapted to travel in a non-rotating displacement along the spindle towards a direction away from the first portion when the first movable component is subjected to an axial thrust applied by the elastic device, while the second movable component is adapted to travel in a non-displacing rotation under action of the cam structures.

The present invention further provides a portable electrical device, comprising a first body portion, a second body portion, a sliding module and the aforesaid multi-staged hinge assembly. Each of the sliding module and the multi-staged hinge assembly are connected to both the first body portion and the second body portion such that through the cooperation of the sliding module and the multi-staged hinge assembly, the second body portion is able to rotate after sliding relative to the first body portion. Thereby, a relative rotation can occur in the second body portion of the portable electrical device through the operation of the multi-staged hinge assembly. The multi-staged hinge assembly features a small volume and simplified structure, so both the volume and costs of the portable electrical device can be reduced.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
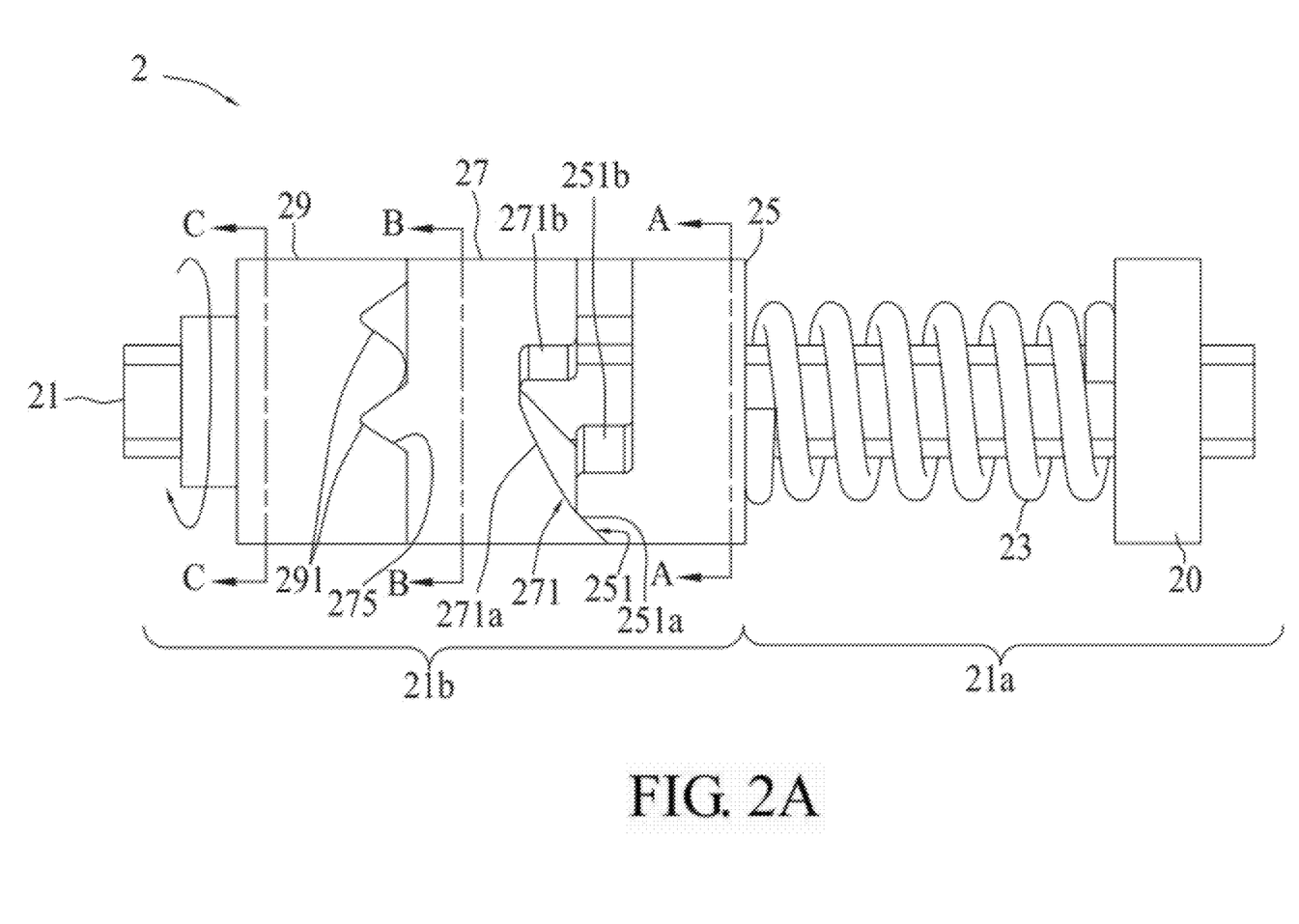
FIG. 2A is a schematic view of a multi-staged hinge assembly of the present invention.

FIG. 2A depicts an embodiment of the present invention, which is a multi-staged hinge assembly 2. The multi-staged hinge assembly 2 is comprised of a stopper 20, a spindle 21, an elastic device 23, a first movable component 25 and a second movable component 27. The spindle 21 is in the form of a long rod, and for purposes of disclosure and description, may be defined to comprise a first portion 21a and a second portion 21b. The stopper 20 is fixedly disposed on the first portion 21a of the spindle 21 opposite the first movable component 25, while the elastic device 23 is disposed on the first portion 21a between the stopper 20 and the first movable component 25. The elastic device 23 has two opposite ends abutted against the stopper 20 and the first movable component 25 respectively.

Figure 2B:
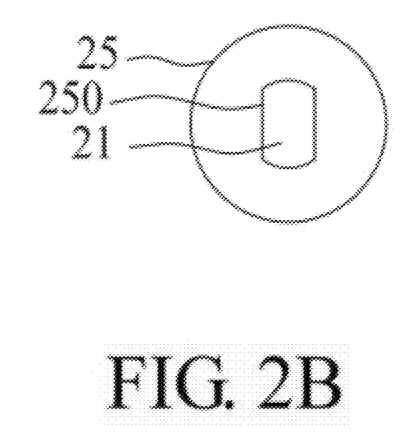
FIG. 2B is a cross-sectional view of the multi-staged hinge assembly along line A-A of FIG. 2A.

In contrast to the conventional spindle with a circular cross-section, the spindle 21 in the present invention is designed with a non-circular cross-section as shown in FIG. 2B. The first movable component 25 is formed with a first inner periphery to define a first axial hole 250. The first inner periphery has a shape corresponds to the non-circular cross-section of the spindle 21, so the first axial hole 250 is also formed with a non-circular cross-section adapted to match the non-circular cross-section of the spindle 21. By virtue of the first axial hole 250, the first movable component 25 can be movably disposed over the spindle 21. Conceivably, because the spindle 21 and the first movable component 25 are fitted together by virtue of the respective non-circular cross-sections, movement of the first movable component 25 on the spindle 21 is restricted; in other words, the first movable component 25 is restricted from rotating about the spindle 21 but is only allowed to displace axially on the spindle 21, i.e., to move in a non-rotating displacement.

Figure 2C:
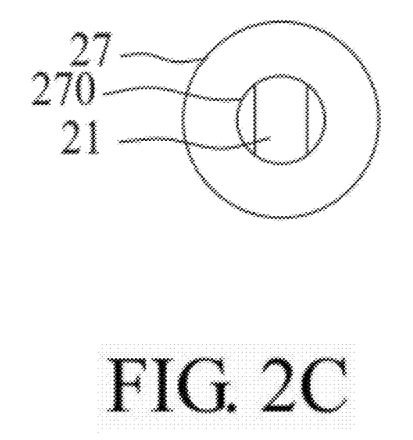
FIG. 2C is a cross-sectional view of the multi-staged hinge assembly along line B-B of FIG. 2A.

Similar to the disposition of the first movable component 25, the second movable component 27 is substantially disposed over the second portion 21b of the spindle 21 adjacent to the first movable component 25 and opposite the elastic device 23. Further, in reference to FIG. 2C, unlike the first movable component 25 with a non-circular first axial hole 250, the second movable component 27 is formed with a second inner periphery which is substantially circular to define a second axial hole 270 with a circular cross-section for the spindle 21 to be inserted therethrough. Through the cooperation of the spindle 21 and the circular second axial hole 270 of the second movable component 27, the second movable component 27 can move in a non-displacing rotation on the spindle 21. In this embodiment, the first movable component 25 and the second movable component 27 are cams with axial holes of different shapes. Furthermore, the present invention utilizes the non-circular spindle 21 in conjunction with movable components that have axial holes of different shapes, so the need of the shell in the prior art can be eliminated.

In this embodiment, the elastic device 23 includes a spring, preferably a pre-compressed spring (i.e., pre-stored with elastic energy), that is disposed over the first portion 21a of the spindle 21. Conceivably, the maximum distance between the stopper 20 and the first movable component 25 must not exceed the free length of the spring (i.e., a length of the spring when no compressive force is applied thereon). Thus, the spring is initially held in the pre-compressed state so that when the elastic force is released, an axial thrust is applied along the spindle 21. Furthermore, because one end of the spring abuts against the stopper 20 that is fixed, the axial thrust will be release from the first portion 21a towards the second portion 21b so that the first movable component 25 tends to be forcedly moved towards a direction away from the first portion 21a. However, instead of being limited to a spring, the elastic device 23 may also be other elastic elements in other embodiments, and may be readily substituted by those of ordinary skill in the art.

Next, the interactive relationships between the first movable component 25 and the second movable component 27 will be further described. To have the first movable component 25 drive the second movable component 27 to rotate, the first movable component 25 and the second movable component 27 are designed to have a first cam structure 251 and a second cam structure 271 respectively. The first cam structure 251 is formed on the first movable component 25 at an end, in which the end is opposite to the other end of the first movable component 25 in contact with the elastic device 23, while the second cam structure 271 is formed on the second movable component 27 at an end abutting against the first cam structure 251. In more detail, each of the cam structures is substantially formed with an inclined surface respectively; i.e., the first cam structure 251 of the first movable component 25 comprises a first inclined surface 251a, while the second cam structure 271 of the second movable component 27 comprises a second inclined surface 271a. The first inclined surface 251a is operatively associated with the second inclined surface 271a in such a way that the second inclined surface 271a can slide relative to the first inclined surface 251a. Meanwhile, to further define an extent to which the second movable component 27 rotates relative to the first movable component 25, a first engagement end 251b is further formed along the first inclined surface 251a while a second engagement end 271b is further formed along the second inclined surface 271a. The second engagement end 271b is operatively associated with the first engagement end 251b in such a way that when the second inclined surface 271a slides to a predetermined extent relative to the first inclined surface 251a, the second engagement end 271b will contact and abut against the first engagement end 251b exactly to stop the second movable component 27 from further rotation.

Figure 3:
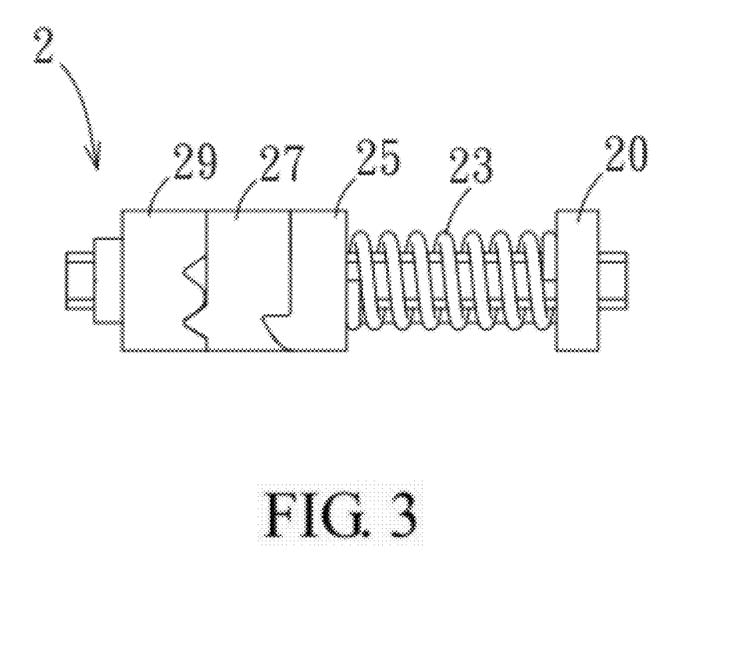
FIG. 3 is a schematic view of the multi-staged hinge assembly of the present invention in another state.

In reference to both FIGS. 2A and 3, with the arrangement of the aforesaid elements, when the elastic device 23 applies the axial thrust to the second portion 21b along the spindle 21 so that the first movable component 25 is forced to move in a non-rotating displacement away from the first portion 21a (i.e., towards the second portion 21b), the first movable component 25 which can only move in a non-rotating displacement along the spindle 21 will drive the second movable component 27 to travel in a non-displacing rotation on the spindle 21. The previous action occurs because of the interaction between the first cam structure 251 and the second cam structure 271. The second inclined surface 271a of the second movable component 27 is adapted to slide relative to the first inclined surface 251a of the first movable component 25. Consequently, the second cam structure 271 is rotated from the first position shown in FIG. 2A to the second position shown in FIG. 3.

Figure 2D:
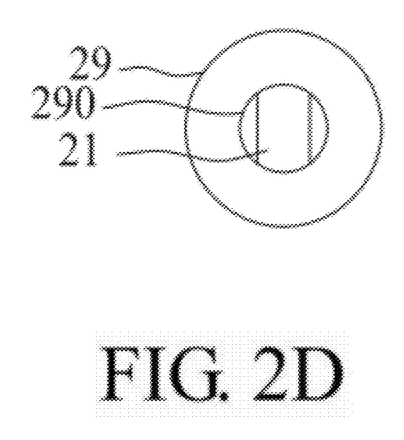
FIG. 2D is a cross-sectional view of the multi-staged hinge assembly along line C-C of FIG. 2A.
Figure 4:
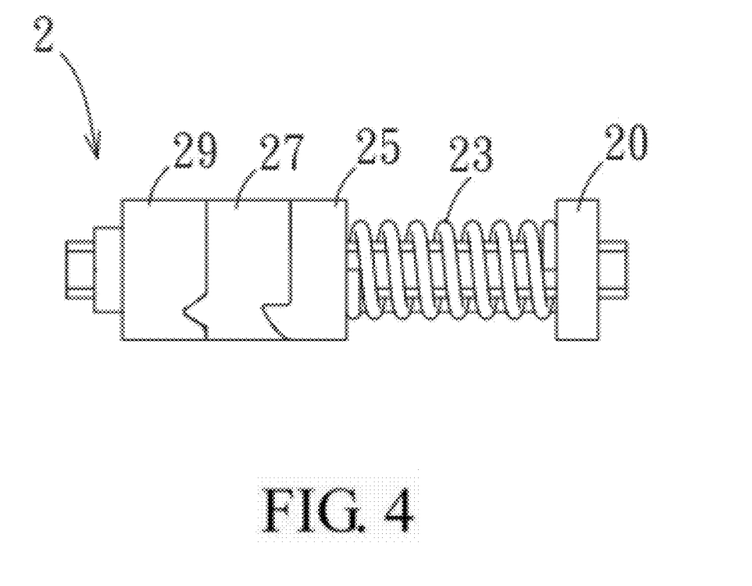
FIG. 4 is a schematic view of the multi-staged hinge assembly of the present invention in a further state.
Figure 5A:
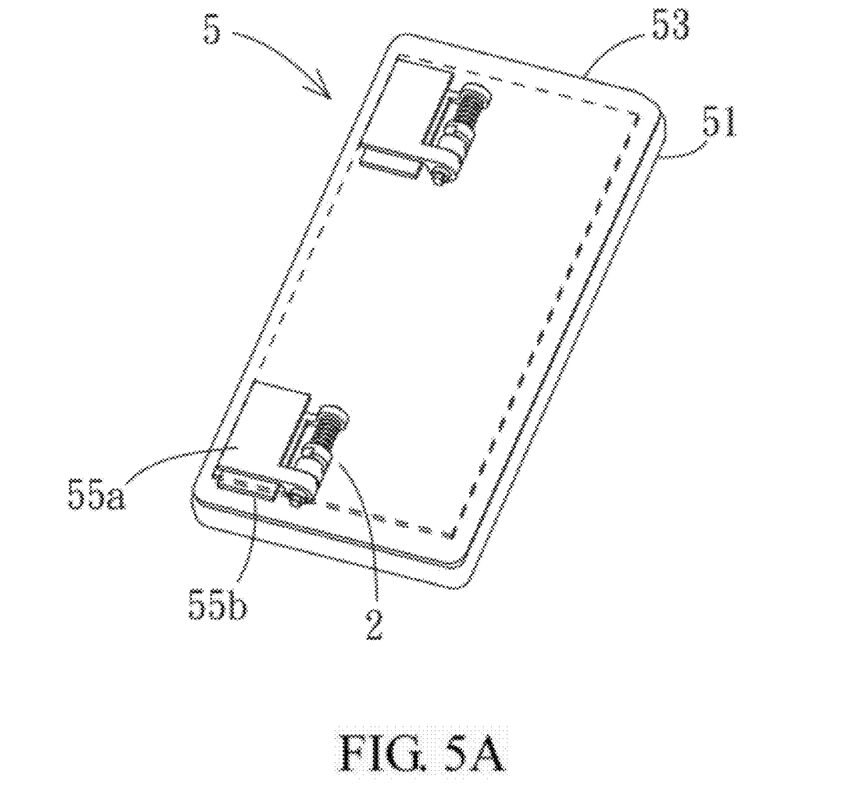
FIGS. 5A and 5B are schematic views of a portable electrical device using the multi-staged hinge assembly of the present invention in a closed state.
Figure 5B:
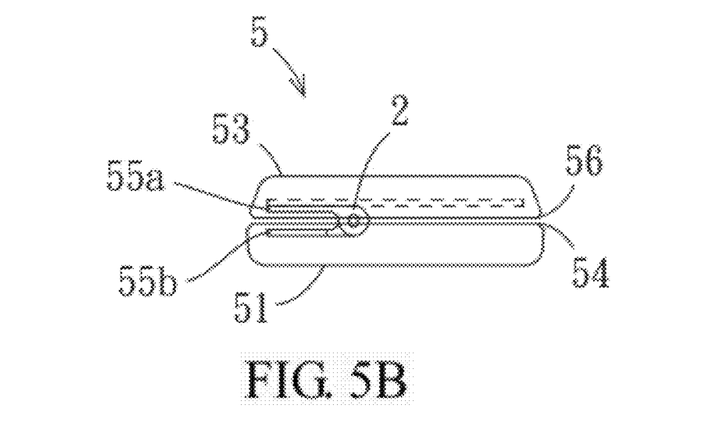

In reference to FIGS. 2A, 3, and 4, in this embodiment, the multi-staged hinge assembly 2 may further comprise a third movable component 29 formed with a third inner periphery to define a third axial hole 290 (as shown in FIG. 2D). Similar to the circular second axial hole 270 of the second movable component 27, the third axial hole 290 of the third movable component 29 also has a substantially circular cross-section for the spindle 21 to be inserted therethrough. Thus, the third movable component 29 is disposed over the second portion 21b of the spindle 21 and can rotatably engage with the second movable component 27 at an end thereof, in which the end is opposite to the other end of the second movable component abutting against the first movable component 25 (i.e., the second movable component 27 is disposed between the first movable component 25 and the third movable component 29). When the second movable component 27 rotates from the first position shown in FIG. 2A to the second position shown in FIG. 3, the third movable component 29 also rotates synchronously with the second movable component 27.

As shown, a male structure 275 and a female structure 291 that are complementary with each other are further included between the second movable component 27 and the third movable component 29 so that the third movable component 29 is adapted to engage with the second movable component 27. In some cases, the third movable component 29 may also move in a non-displacing rotation relative to the second movable component 27. For example, the male structure 275 is formed on the second movable component 27 at an end engaged with the third movable component 29, while the female structure 291 is formed on the third movable component 29 at an end engaged with the second movable component 27. In reference to both FIGS. 3 and 4, in this embodiment, the male structure 275 is a protrusion whose tip is rounded, while the female structure 291 comprises at least two recesses whose bottom and junctures are also rounded (i.e. the bottom and the juncture are formed of dome portions). The protrusion is adapted to engage with one of the recesses respectively. When the second movable component 27 and the third movable component 29 are at the second position as shown in FIG. 3 with the first movable component 25 engaged with the second movable component 27, a further external force applied to the third movable component 29 will rotate the third movable component 29 with respect to the second movable component 27 so that the male structure 275 engages with the other female structure 291 instead. As a result, the third movable component 29 is rotated from the second position shown in FIG. 3 to the third position shown in FIG. 4 with respect to the second movable component 27. It should be appreciated that what is illustrated above is only for the purpose of description rather than to limitation; in other embodiments, the male structure 275 and the female structure 291 may further be of other complementary structures. Moreover, more male structures 275 and female structures 291 may be provided so that the third movable component 29 can be rotated to more than two positions with respect to the second movable component 27.

Figure 9A:
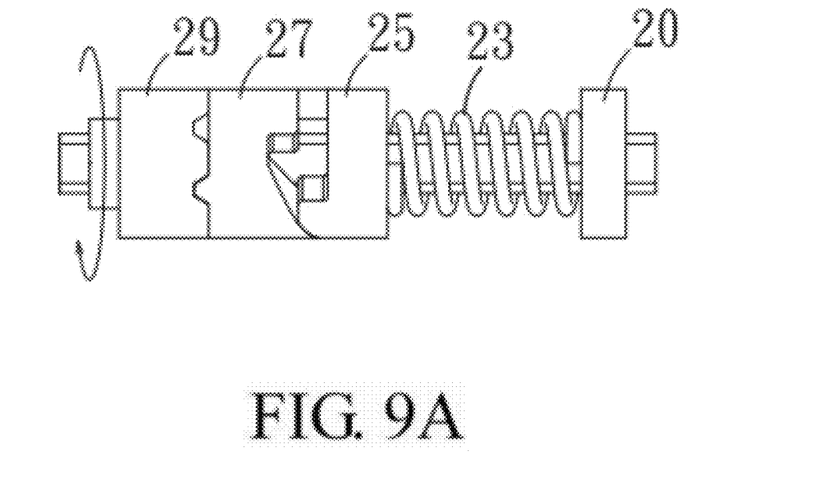
FIGS. 9A and 9B are schematic views of other examples of the multi-staged hinge assembly of the present invention.

Next, in reference to FIG. 9A as well, the male structure 275 and the female structures 291 are formed of a material of a large friction coefficient. The protrusion of the male structure 275 and the recesses of the female structures 291 have modified tips so that they are flatter, and the distance between the two female structures 291 of the third movable component 29 is extended to form a flat portion. In this case, during the rotation of the third movable component 29 from the aforesaid second position to the third position, if the user does not further apply a force, the male structure 275 may temporarily come to a stop on the flat portion of the third movable component 29, i.e., between these female structures 291, due to the static friction between the protrusion and the flat portion.

Figure 9B:
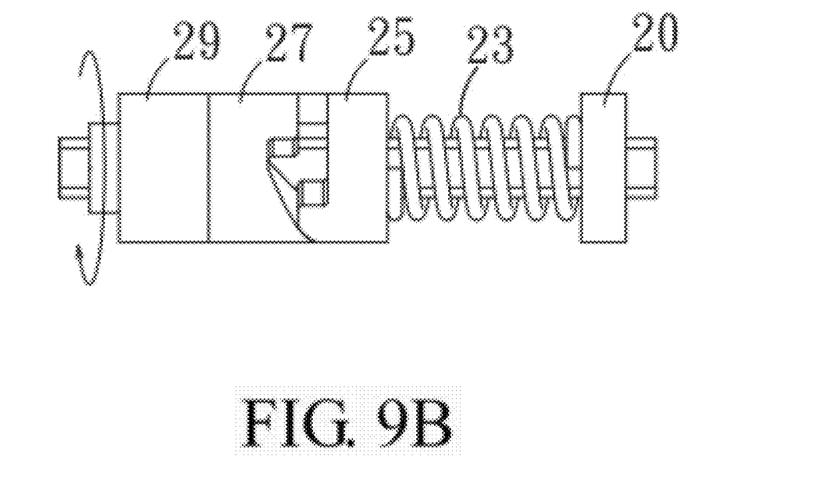

In another example as shown in FIG. 9B, if the respective contact surfaces of the second movable component 27 and the third movable component 29 are formed of materials of a sufficiently large friction coefficient and the elastic device has a large elastic coefficient (i.e., with large elastic energy), the male structure 275 and the female structures 291 may even be eliminated. Instead, the static friction that is generated when the contact surfaces of the second movable component 27 and the third movable component 29 abut against each other may be used directly for locating purposes. In this case, when rotating from the aforesaid second position to the third position, the third movable component 29 may temporarily come to a stop on the surface of the second movable component 27 if the user does not further apply a force.

Furthermore, another way to increase the friction between the contact surfaces is to form the recesses of the female structures 291 and the protrusion of the male structure 275 as a plurality of complementary fine structures, e.g., a plurality of complementary fine grooves. This will also allow the third movable component 29, after having rotated to the second position along with the second movable component 27, to rotate further to a third position under the action of an external force.

With the design of this embodiment, when the first movable component 25 moves in the non-rotating displacement, the second movable component 27 and the third movable component 29 will first move together in the non-displacing rotation accordingly and then, depending on the different use conditions, the third movable component 29 may further rotate with respect to the second movable component 27.

It should be noted that instead of using a shell as in the conventional hinge assembly, the multi-staged hinge assembly 2 disclosed in this embodiment uses the non-circular spindle 21 in conjunction with the movable components 25, 27, 29 with axial holes of different shapes to bring about necessary relative movement. Through the different design of cross-sections of the axial holes, the inclined surfaces or the cam structures, different directions and angles of rotation may be obtained. Furthermore, in this embodiment, the spindle 21 is fixed so that the second movable component 27 and the third movable component 29 rotate with respect to the spindle 21; however, as can be known from the principle of relative movement, arrangements where the third movable component 29 is fixed and the spindle 21 moves relative thereto may also be used in practice, which will be readily appreciated by those of ordinary skill in the art may readily based on concepts of the present invention.

FIGS. 5A to 8B depict another embodiment of the present invention, which is a portable electrical device 5 comprising the aforesaid multi-staged hinge assembly 2. The portable electrical device 5 is mainly comprised of a first body portion 51, a second body portion 53, a sliding module (not shown) and the multi-staged hinge assembly 2 disclosed in the aforesaid embodiment. Both the sliding module and the multi-staged hinge assembly 2 are connected to the first body portion 51 and the second body portion 53. In this embodiment, the portable electrical device 5 has two multi-staged hinge assemblies 2; the detailed structure and operations of which are just as set forth in the above embodiment and will not be described again herein. Additionally, the first body portion 51 of this embodiment may further comprise a keyboard (not shown), while the second body portion 53 may further comprise a display (not shown). By virtue of the multi-staged hinge assemblies 2, the first body portion 51 and the second body portion 53 are able to rotate relative to each other, thereby providing the user a better viewing angle.

In more detail, the second body portion 53 of the portable electrical device 5 is connected to the third movable component 29 of the multi-staged hinge assemblies 2 by means of a connecting component 55a. The stopper 20 is fixedly and integrally connected to the spindle 21 to form a single piece. The first body portion 51 is connected to the stopper 20 of the multi-staged hinge assemblies 2 by means of another connecting component 55b. In reference to both FIGS. 5A and 5B, only one of the multi-staged hinge assemblies 2 will be described hereinbelow. In the initial closed state of the portable electrical device 5, the first body portion 51 and the second body portion 53 abut against each other, i.e., a lower edge 56 of the second body portion 53 abuts against an upper edge 54 of the first body portion 51. Therefore, in this state, the multi-staged hinge assemblies 2 are restricted from any movement, with the elastic device 23 kept at a pre-compressed state (e.g., a spring in a pre-compressed state).

Figure 6A:
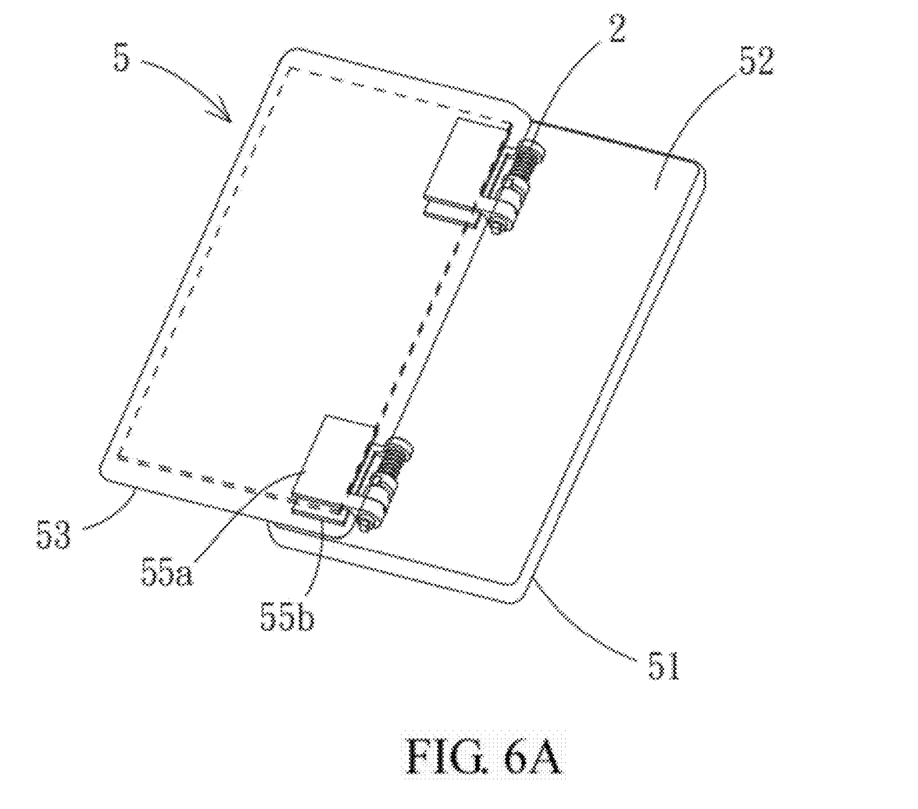
FIGS. 6A and 6B are schematic views of the portable electrical device of the present invention in a slide-open state.
Figure 6B:
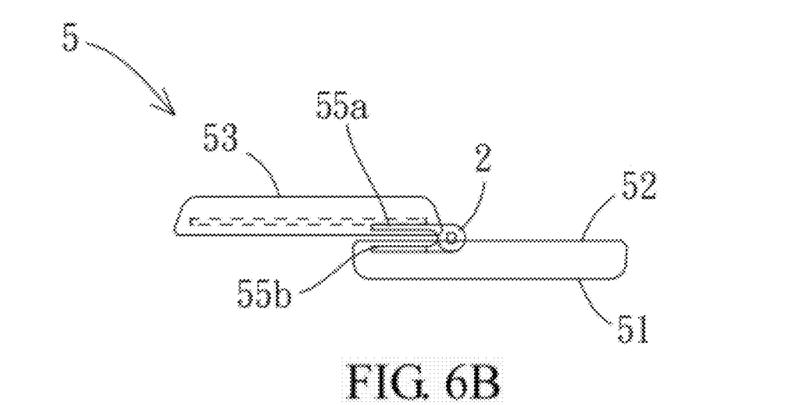

Furthermore, in reference to FIGS. 6A and 6B, when the keyboard needs to be operated or a wider display area is needed, the user may slide the second body portion 53 along the surface 52 of the first body portion 51 under guide of the sliding module to expose the keyboard (usually arranged on the surface 52). Accordingly, the portable electrical device 5 turns from the closed state into an open state for the user to input instructions into the portable electrical device 5 through the keyboard.

Figure 7A:
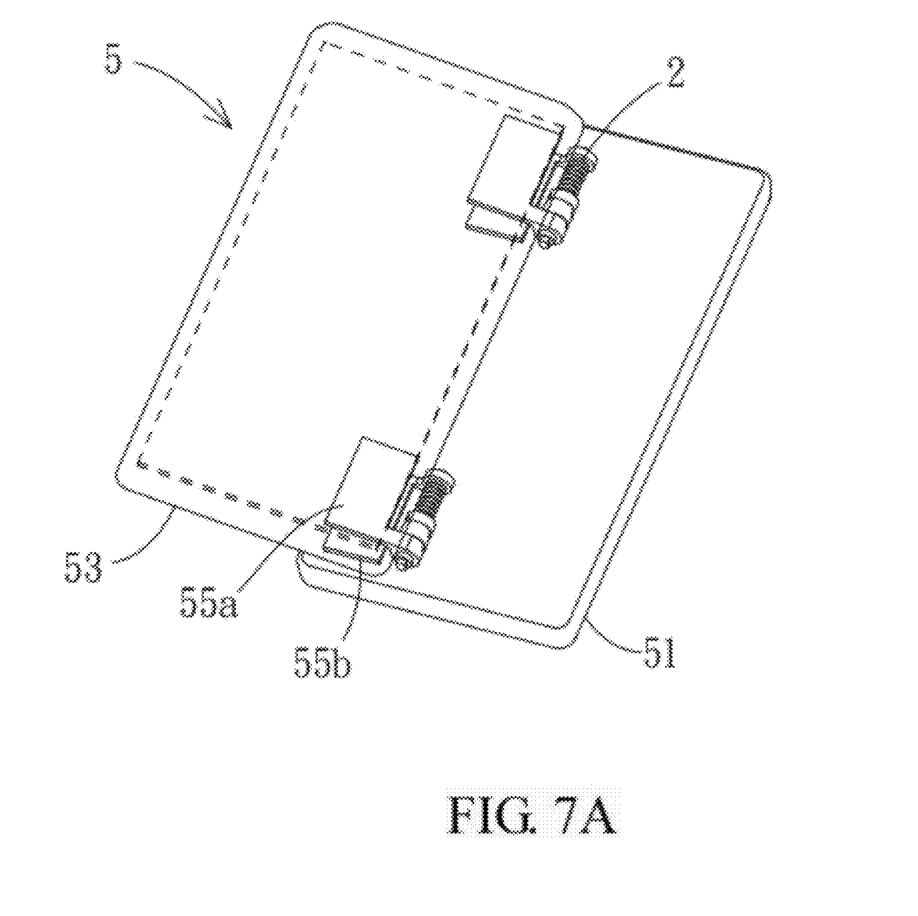
FIGS. 7A and 7B are schematic views of the portable electrical device of the present invention in an automatic tilting state.
Figure 7B:
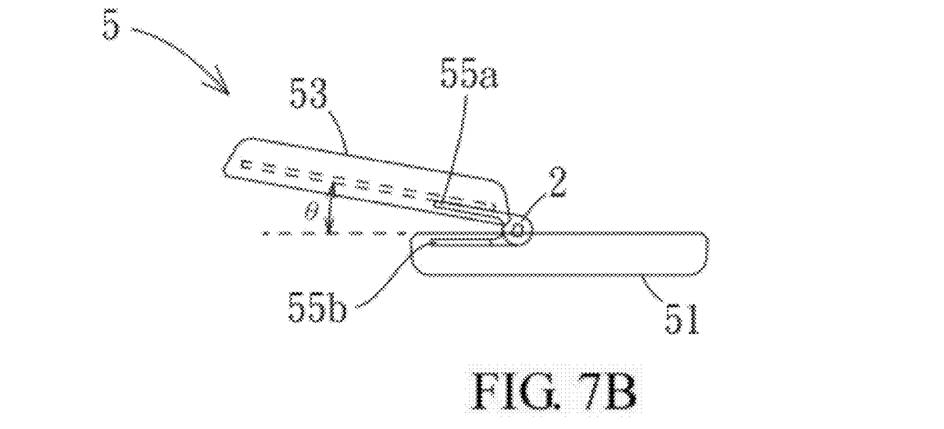

Once the second body portion 53 guided by the sliding module slides to the position shown in FIGS. 6A, 6B, the detent force generated when the lower edge 56 of the second body portion 53 abuts against the upper edge 54 of the first body portion 51 disappears and the multi-staged hinge assemblies 2 are no longer restricted from movement. Then, the elastic energy of the pre-compressed elastic device 23 is released to rotate the multi-staged hinge assemblies 2 from the first position shown in FIG. 2A to the second position shown in FIG. 3, in which case the portable electrical device 5 exhibits a relative positional relationship between the first body portion 51 and the second body portion 53 as shown in FIGS. 7A and 7B. Also, in reference to FIGS. 2A and 3, due to the engagement of the male structure 275 of the second movable component 27 and the female structure 291 of the third movable component 29, the third movable component 29 rotates synchronously with the second movable component 27 without any relative rotation therebetween. Also, because the stopper 20 is connected integrally to the first body portion 51 by means of the connecting component 55b, the connecting component 55a will rotate with the third movable component 29 automatically while the first body portion 51 and the connecting component 55b remains stationary. That is, the second body portion 53 will rotate automatically with respect to the first body portion 51 to provide an automatic tilting effect. The rotation that automatically tilts the second body portion 53 until the first engagement ends 251b and the second engagement ends 271b of the multi-staged hinge assemblies 2 are engaged with each other to stop the movement (i.e., the second position shown in FIG. 3). At this point, the second body portion 53 forms a tilt angle θ with the first body portion 51. Substantially, the tilt angle θ may be between 0° and 20°, which is well suited for general handheld use conditions.

Figure 8A:
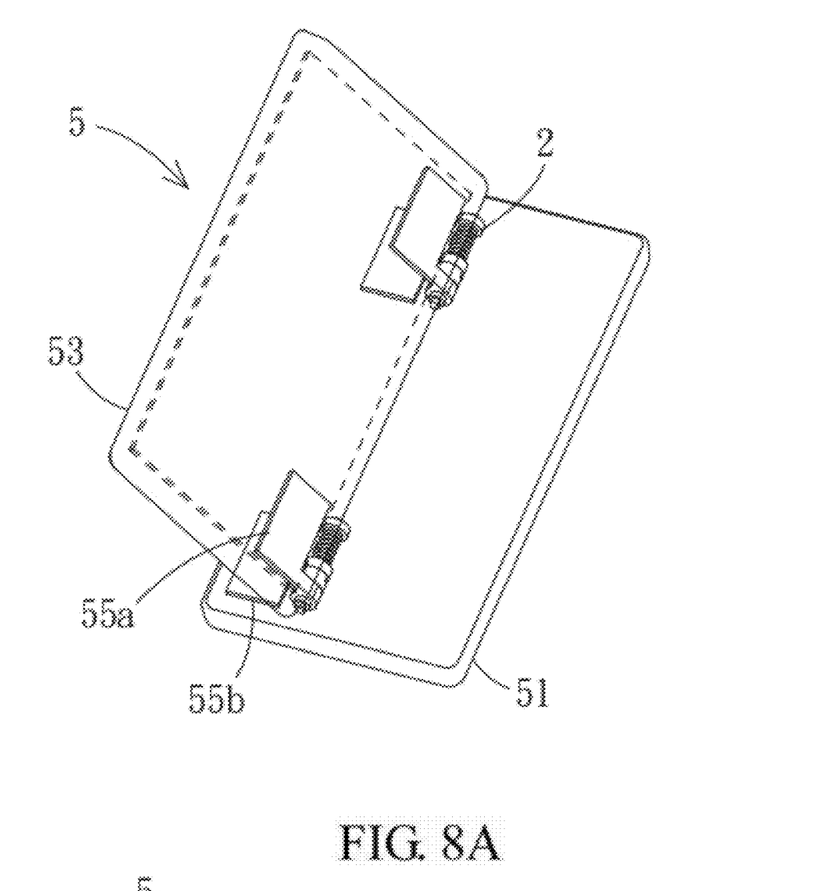
FIGS. 8A and 8B are schematic views of the portable electrical device of the present invention in another operation state.
Figure 8B:
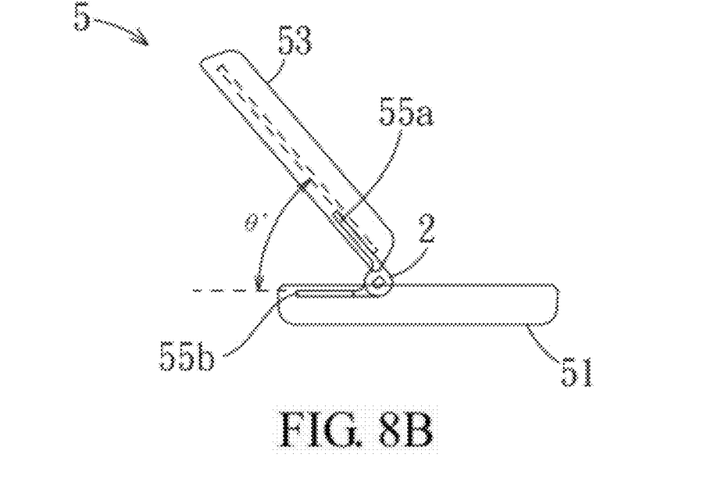

Next, in reference to FIGS. 8A and 8B, in this embodiment, the user may further adjust the tilt angle of the second body portion 53 with respect to the first body portion 51. In more detail, the user may apply a force to rotate the second body portion 53 to a larger tilt angle θ'. In practice, the tilt angle θ' may be between 20° and 50° and larger than θ, which is well suitable for use conditions where the portable electrical device 5 is placed flat on a table.

In reference to FIGS. 2A, 3 and 4, during this stage, the tilt angle is adjusted by changing the relative positional relationships between the female structures 291 of the third movable component 29 and the male structure 275 of the second movable component 27. When subjected to a force, the third movable component 29 will rotate with respect to the second movable component 27; i.e., the male structure 275 (i.e., the protrusion) of the second movable component 27 will slide from one recess to another and then be engaged. Once the male structure 275 slides through the smooth dome portion where the two female structures 291 join with each other, the protrusion can slide forward to rotate the third movable component 29 from the second position to the third position by means of the elastic energy released from the elastic device 23 and interaction between the male structure 275 and the female structures 291 even if the user stops applying the force to the second body portion 53. Accordingly, the second body portion 53 of the portable electrical device 5 automatically rotates from the previous tilt angle θ to another predetermined angle θ' to accomplish so-called the click point adjustment. Of course, the multi-staged hinge assemblies 2 of the present invention may also have a plurality of click points to satisfy the different needs of users and deliver an optimal effect.

It should be noted that the design of the dome portion where the connection between the two female structures 291 is only provided as an example but not for purposes of limitation; rather, the male structure 275 and the female structures 291 may be designed differently depending on practical needs. As shown in FIG. 9A, the protrusion of the male structure 275 and the recesses of the female structures 291 have modified tips so that they are flatter. In another example as shown in FIG. 9B, the static friction that is generated when the contact surfaces of the second movable component 27 and the third movable component 29 abut against each other is used directly for locating purpose. Additionally, the recesses of the female structures 291 and the protrusion of the male structure 275 may be formed into a plurality of fine structures complementary to each other so that as the user continues to apply a force, the second body portion 53 can further rotate from the automatically tilted angle θ to an angle θ' relative to the first body portion 51, thereby obtaining a free stop effect which lasts until the user has decided an optimal viewing angle. How the male structures and the female structures move has already been described in the above embodiments and thus will not be further described herein. With the aforesaid design, multiple options of relative angles between the second body portion 53 and the first body portion 51 can be provided. In other words, those skilled in the art may provide the second body portion 53 with diversified tilt angles through different designs of the male structure 275 and the female structures 291.

According to the above descriptions, the multi-staged hinge assembly of the present invention and the portable electrical device comprising the same use a spindle having a non-circular cross-section in conjunction with the cam structures and differently shaped axial holes of a plurality of movable components. As compared to the prior art, this eliminates the use of the shell while still accomplishing the relative movement of the movable components, resulting in a simpler construction, smaller volume, reduced assembling time and lower costs of the multi-staged hinge assembly. When using the portable electrical device comprising the multi-staged hinge assembly, subsequent to the relative sliding movement, the body portion will present a tilt angle to provide a wider viewing field. As compared to the prior art, the multi-staged hinge assembly of the present invention that features a smaller volume and less space occupation can effectively reduce the overall volume of the portable electrical device. Alternatively, with the same volume as in the case using the conventional hinge assembly, the portable electrical device may have a larger space for accommodating additional elements with other functions.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A multi-staged hinge assembly, comprising:
   a spindle having a first portion and a second portion;
   an elastic device being disposed on the first portion and adapted to provide an axial thrust towards the second portion;
   a first movable component comprising a first inner periphery to define a first axial hole for the first movable component to be penetrated through the second portion of the spindle;
   a second movable component comprising a second inner periphery to define a second axial hole for the second movable component to be penetrated through the second portion of the spindle, in which the second movable component is adjacent to the first movable component and opposite to the elastic device; and
   a third movable component comprising a third axial hole for the third movable component to be penetrated through the second portion of the spindle and to be connected with an end of the second movable component, in which the end is opposite to the other end of the second movable component abutting against the first movable component;
   wherein the spindle has a non-circular cross-section, in which the first inner periphery has a shape corresponding to the non-circular cross-section, the second inner periphery is circular, and the third axial hole has a cross-section which is circular, therefore, the first movable component is adapted to travel in a non-rotating displacement toward a direction away from the first portion when the first movable component is subjected to the axial thrust, while the second movable component is adapted to travel in a non-displacing rotation in response to an action resulting from the first movable component, the third movable component is capable of traveling in the non-displacing rotation along with the second movable component.

2. The multi-staged hinge assembly as claimed in claim 1, wherein the first movable component has a first cam structure formed at an end of the first movable component, in which the end is opposite to the other end of the first movable component in contact with the elastic device.

3. The multi-staged hinge assembly as claimed in claim 2, wherein the second movable component comprises a second cam structure abutting against the first cam structure, and is capable of traveling in a relative motion with respect to the first cam structure.

4. The multi-staged hinge assembly as claimed in claim 3, wherein the first cam structure has a first inclined surface and the second cam structure has a second inclined surface, in which the first inclined surface operatively associates with the second inclined surface to drive the second movable component to travel in the non-displacing rotation from a first position to a second position when the first movable component travels in the non-rotating displacement.

5. The multi-staged hinge assembly as claimed in claim 4, wherein the first inclined surface comprises a first engagement end, and the second inclined surface comprises a second engagement end corresponding to the first engagement end to constrain the second movable component at the second position.

6. The multi-staged hinge assembly as claimed in claim 5, wherein the second movable component and the third movable component are respectively formed with a male structure and a female structure for operatively associating with each other.

7. The multi-staged hinge assembly as claimed in claim 6, wherein the male structure is a protrusion and the female structure comprises at least two recesses which are continuously disposed, the protrusion being adapted to couple to each of the recesses for the third movable component to rotate with respect to the second movable component.

8. The multi-staged hinge assembly as claimed in claim 7, wherein the third movable component further comprises a dome portion disposed between the recesses for the protrusion to slide thereon.

9. The multi-staged hinge assembly as claimed in claim 5, wherein each of the second movable component and the third movable component is formed with a contact surface to provide a static friction therebetween.

10. The multi-staged hinge assembly as claimed in claim 5, further comprising a stopper disposed onto the first portion of the spindle and opposite to the first movable component, wherein the elastic device is a spring encircling onto the first portion of the spindle, and the elastic device comprises two opposite ends abutting against the stopper and the first movable component respectively.

11. The multi-staged hinge assembly as claimed in claim 7, wherein the third movable component further comprises a flat portion disposed between the recesses for the protrusion to be positioned thereon by virtue of a static friction therebetween.

12. A portable electrical device, comprising:
   a first body portion;
   a second body portion;
   a sliding module connecting to the first body portion and the second body portion, the first body portion having a surface, the second body portion being capable of sliding on the first body portion along the surface thereof; and
   a multi-staged hinge assembly, comprising:
      a spindle having a first portion and a second portion;
      an elastic device being disposed on the first portion and adapted to provide an axial thrust towards the second portion;

a first movable component comprising a first inner periphery to define a first axial hole for the first movable component to be penetrated through the second portion of the spindle;

a second movable component comprising a second inner periphery to define a second axial hole for the second movable component to be penetrated through the second portion of the spindle, in which the second movable component is adjacent to the first movable component and opposite to the elastic device; and a third movable component comprising a third axial hole for the spindle to penetrate therethrough to dispose onto the second portion and to connected with an end of the second movable component, in which the end is opposite to the other end of the second movable component abutting against the first movable component;

wherein the spindle has a non-circular cross-section, in which the first inner periphery has a shape corresponding to the non-circular cross-section, the second inner periphery is circular, and the third axial hole has a cross-section which is circular, therefore, the first movable component is adapted to travel in a non-rotating displacement toward a direction away from the first portion when the first movable component is subjected to the axial thrust, while the second movable component is adapted to travel in a non-displacing rotation in response to an action resulting from the first movable component, the third movable component is capable of traveling in the non-displacing rotation along with the second movable component;

wherein the multi-staged hinge assembly connects to the first body portion and the second body portion so that the second body portion is capable of moving in the non-displacing rotation after sliding with respect to the first body portion.

13. The portable electrical device as claimed in claim 12, wherein the first movable component comprises a first cam structure formed at an end of the first movable component, in which the end is opposite to the other end of the first movable component in contact with the elastic device.

14. The portable electrical device as claimed in claim 13, wherein the second movable component comprises a second cam structure abutting against the first cam structure, and is capable of traveling in a relative motion with respect to the first cam structure.

15. The portable electrical device as claimed in claim 14, wherein the first cam structure comprises at least one first inclined surface and the second cam structure comprises at least one second inclined surface, in which the first inclined surface operatively associates with the second inclined surface to drive the second movable component to travel in the non-displacing rotation from a first position to a second position when the first movable component travels in the non-rotating displacement.

16. The portable electrical device as claimed in claim 15, wherein the first inclined surface comprises at least one first engagement end, and the second inclined surface comprises at least one second engagement end corresponding to the first engagement end to constrain the second movable component at the second position.

17. The portable electrical device as claimed in claim 16, wherein the second movable component and the third movable component are respectively formed with at least one male structure and at least one female structure for operatively associating with each other.

18. The portable electrical device as claimed in claim 17, wherein the male structure is a protrusion and the female structure comprises at least two recesses which are continuously disposed, the protrusion being adapted to couple to each of the recesses for the third movable component to rotate with respect to the second movable component.

19. The portable electrical device as claimed in claim 18, wherein the second body portion connects to the third movable component so that the second body portion rotates along with the non-displacing rotation of the third movable component after the second body portion slides with respect to the first body portion.

20. The portable electrical device as claimed in claim 18, wherein the third movable component further comprises a dome portion disposed between the recesses for the protrusion to slide thereon.

21. The portable electrical device as claimed in claim 18, wherein the third movable component further comprises a flat portion disposed between the recesses for the protrusion to be positioned thereon by virtue of a static friction therebetween.

22. The portable electrical device as claimed in claim 12, wherein the second body portion further comprises a display and the first body portion further comprise a keyboard assembly disposed on the surface thereof.

23. The portable electrical device as claimed in claim 16, wherein each of the second movable component and the third movable component is formed with a contact surface to provide a static friction therebetween.

24. The portable electrical device as claimed in claim 16, further comprising a stopper disposed onto the first portion of the spindle and opposite to the first movable component, wherein the elastic device is a spring encircling onto the first portion of the spindle, and the elastic device comprises two opposite ends abutting against the stopper and the first movable component respectively.

* * * * *